(12) United States Patent
Michikawauchi

(10) Patent No.: US 9,488,138 B2
(45) Date of Patent: Nov. 8, 2016

(54) CONTROL DEVICE OF INTERNAL COMBUSTION ENGINE

(75) Inventor: Ryo Michikawauchi, Numazu (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 108 days.

(21) Appl. No.: 14/390,123

(22) PCT Filed: Apr. 5, 2012

(86) PCT No.: PCT/JP2012/059395
§ 371 (c)(1),
(2), (4) Date: Oct. 2, 2014

(87) PCT Pub. No.: WO2013/150638
PCT Pub. Date: Oct. 10, 2013

(65) Prior Publication Data
US 2015/0059710 A1    Mar. 5, 2015

(51) Int. Cl.
*F02M 33/02* (2006.01)
*F02M 25/07* (2006.01)
*F02M 25/08* (2006.01)
*F02D 41/00* (2006.01)
*F02D 9/10* (2006.01)
*F02B 29/04* (2006.01)

(52) U.S. Cl.
CPC ........ *F02M 25/0854* (2013.01); *F02D 9/1055* (2013.01); *F02D 41/0035* (2013.01); *F02D 41/0065* (2013.01); *F02M 25/0836* (2013.01); *F02B 29/0406* (2013.01); *F02D 41/0007* (2013.01); *F02M 25/089* (2013.01); *F02M 26/05* (2016.02); *F02M 26/06* (2016.02); *F02M 26/23* (2016.02); *Y02T 10/42* (2013.01); *Y02T 10/47* (2013.01)

(58) Field of Classification Search
CPC .................... F02M 25/0854; F02M 25/0836; F02M 25/089; F02M 26/06; F02M 26/05; F02M 26/23; F02D 9/1055; F02D 41/0035; F02D 41/0065; F02D 41/0007; F02B 29/0406; Y02T 10/42; Y02T 10/47
USPC .............. 123/568.19, 568.21, 516, 518, 519, 123/520; 701/103, 108; 60/605.2
See application file for complete search history.

(56) References Cited

FOREIGN PATENT DOCUMENTS

| EP | 1 413 724 A2 | 4/2004 |
|---|---|---|
| JP | 9-310643 A | 12/1997 |

(Continued)

*Primary Examiner* — Hai Huynh
(74) *Attorney, Agent, or Firm* — Sughrue Mion, PLLC

(57) ABSTRACT

The control device of an internal combustion engine of the present invention is a control device of an internal combustion engine in which a bypass channel (25) for bypassing a throttle valve (6) of an engine intake system (5) via an evaporated fuel adsorption device is provided as a fuel emission path to an evaporated fuel adsorption device (22) for adsorbing evaporated fuel in a fuel tank (19), and exhaust gas recirculation is implemented for recirculating exhaust gas via an exhaust gas recirculation passage (17) connected upstream of the entrance of the bypass channel of the engine intake system. An exhaust control valve (18) is disposed in the exhaust gas recirculation passage, intake control valves (27, 28) are disposed in the bypass channel, and when the opening degree of the exhaust control valve is greater than a set opening degree, either the intake control valve is fully closed or the opening degree of the intake control valve is reduced in comparison with times when the opening degree of the exhaust control valve is equal to or less than the set opening degree.

7 Claims, 6 Drawing Sheets

(56) References Cited

FOREIGN PATENT DOCUMENTS

| | | |
|---|---|---|
| JP | 11-182370 A | 7/1999 |
| JP | 2004-144027 A | 5/2004 |
| JP | 2004-308595 A | 11/2004 |
| JP | 2007-64230 A | 3/2007 |
| JP | 2009-281167 A | 12/2009 |
| JP | 2011-105040 A | 6/2011 |

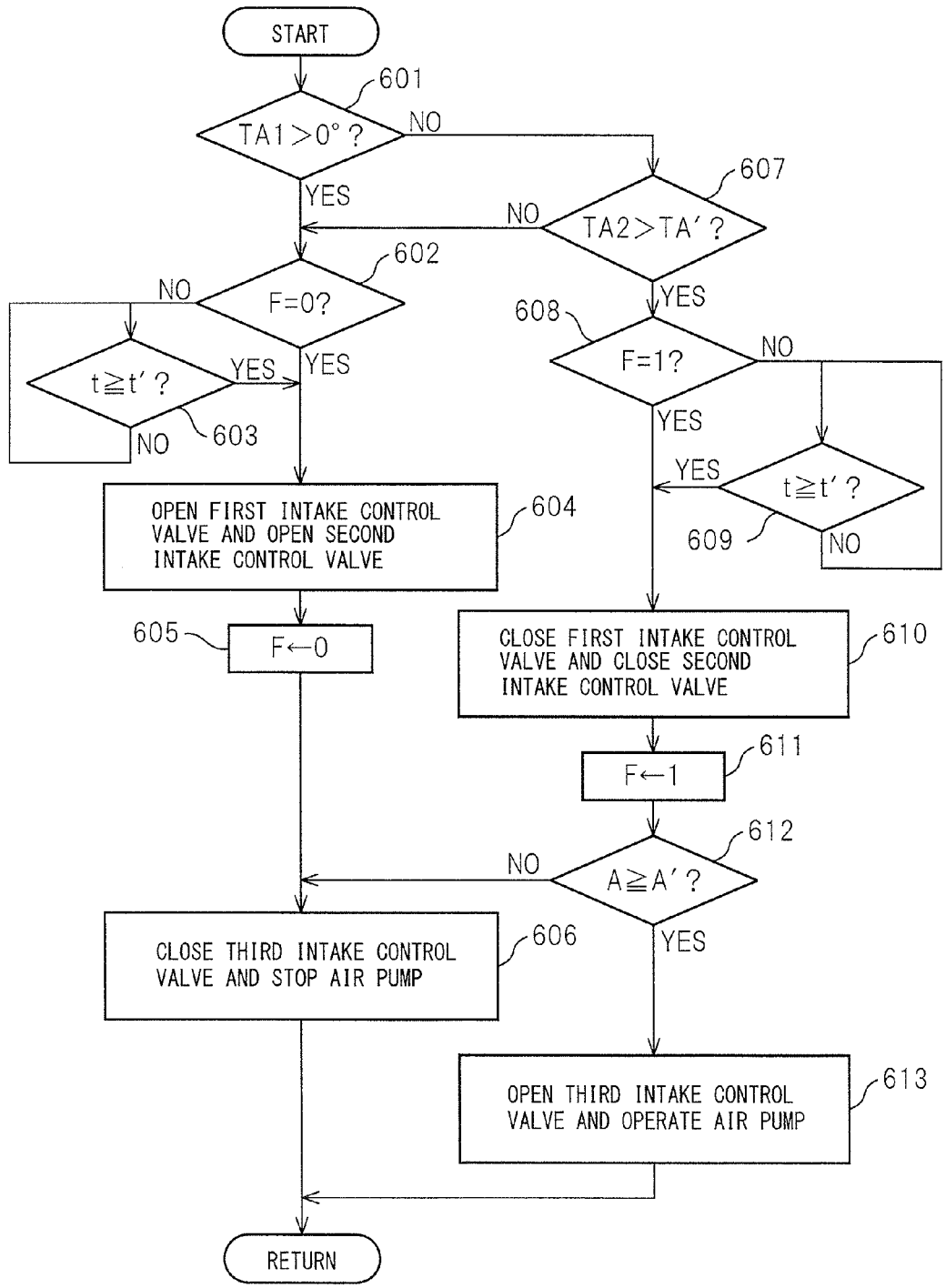

008
CONTROL DEVICE OF INTERNAL COMBUSTION ENGINE

CROSS REFERENCE TO RELATED APPLICATIONS

This application is a National Stage of International Application No. PCT/JP2012/059395 filed Apr. 5,2012, the contents of which are incorporated herein by reference in their entirety.

TECHNICAL FIELD

The present invention relates to a control system of an internal combustion engine.

BACKGROUND ART

To prevent evaporated fuel which is produced in a fuel tank from being discharged to the atmosphere, in general an evaporated fuel adsorption device which adsorbs evaporated fuel (for example, a charcoal canister) is provided. Such an evaporated fuel adsorption device cannot unlimitedly adsorb evaporated fuel. To prevent the amount of adsorbed fuel from reaching the upper limit value and keep evaporated fuel from no longer being adsorbed, it is necessary to discharge the fuel into the engine intake system.

It has been proposed to provide the evaporated fuel adsorption device with a fuel discharge path constituted by a bypass passage which passes through the inside of the evaporated fuel adsorption device and bypasses a throttle valve (see PLT 1). Due to this, it becomes possible to use the intake which passes through the bypass passage to discharge the fuel from the evaporated fuel adsorption device to the downstream side of the throttle valve.

In this regard, in an internal combustion engine, to lower the combustion temperature to reduce the amount of generation of $NO_x$, if necessary, as inert gas with a large heat capacity, exhaust gas is recirculated to the inside of the cylinder. In an engine intake system in which the above-mentioned bypass passage is provided, the exhaust gas is sometimes recirculated to the upstream side from the inlet of the bypass passage of the engine intake system.

CITATIONS LIST

Patent Literature

PLT 1: Japanese Patent Publication No. 11-182370A
PLT 2: Japanese Patent Publication No. 2004-308595A
PLT 3: Japanese Patent Publication No. 09-310643A
PLT 4: Japanese Patent Publication No. 2011-105040A
PLT 5: Japanese Patent Publication No. 2009-281167A
PLT 6: Japanese Patent Publication No. 2007-064230A
PLT 7: Japanese Patent Publication No. 2004-144027A

SUMMARY OF INVENTION

Technical Problem

However, if making exhaust gas recirculate to the upstream side from the inlet of the bypass passage, the exhaust gas passes through the bypass passage together with the intake, the $NO_x$ etc. in the exhaust gas is adsorbed at the evaporated fuel adsorption device, and the evaporated fuel adsorption device ends up falling in evaporated fuel adsorption ability.

Therefore, an object of the present invention is to provide a control system of an internal combustion engine where a bypass passage which bypasses a throttle valve through an evaporated fuel adsorption device is provided at an evaporated fuel adsorption device as a fuel discharge path, intake which passes through the bypass passage enables fuel to be discharged from the evaporated fuel feed device to the engine intake system, and, in accordance with need, exhaust gas is made to recirculate to the upstream side of the inlet of the bypass passage as exhaust gas recirculation, wherein the $NO_x$ etc. in the exhaust gas is adsorbed and thereby the evaporated fuel adsorption device is kept from falling in evaporated fuel adsorption ability.

Solution to Problem

The control system of an internal combustion engine according to claim 1 according to the present invention is a control system of an internal combustion engine where an evaporated fuel adsorption device which adsorbs evaporated fuel in a fuel tank is provided, a bypass passage which bypasses a throttle valve of an engine intake system through the evaporated fuel adsorption device is provided at the evaporated fuel adsorption device as a fuel discharge path, and exhaust gas is made to recirculate through an exhaust gas recirculation passage which is connected to an upstream side from an inlet of the bypass passage of the engine intake system for exhaust gas recirculation, wherein an exhaust control valve is arranged at the exhaust gas recirculation passage, an intake control valve is arranged at the bypass passage, and when an opening degree of the exhaust control valve is larger than a set opening degree, the intake control valve is fully closed or the intake control valve is made smaller in opening degree compared with when the opening degree of the exhaust control valve is the set opening degree or less.

The control system of an internal combustion engine according to claim 2 according to the present invention is the control system of an internal combustion engine according to claim 1 wherein the set opening degree is made the fully closed opening degree.

The control system of an internal combustion engine according to claim 3 according to the present invention is the control system of an internal combustion engine according to claim 1 wherein a compressor is arranged at an upstream side from the inlet of the bypass passage of the engine intake system, a communicating passage which connects the atmosphere and the upstream side of the compressor of the engine intake system through the evaporated fuel adsorption device as another fuel discharge path is provided at the evaporated fuel adsorption device, the intake control valve is fully closed when the opening degree of the exhaust control valve is larger than the set opening degree, and fuel is discharged through the communicating passage from the evaporated fuel adsorption device to the engine intake system.

The control system of an internal combustion engine according to claim 4 according to the present invention is the control system of an internal combustion engine according to claim 3 wherein a pump device which pumps air to the engine intake system side is provided at the communicating passage, and the fuel is discharged through the communicating passage from the evaporated fuel adsorption device to the engine intake system by air which is pumped by the pump device.

The control system of an internal combustion engine according to claim 5 according to the present invention is the control system of an internal combustion engine according to claim 4 wherein when the amount of adsorbed fuel of the evaporated fuel adsorption device is a set amount or more, the fuel is discharged through the communicating passage from the evaporated fuel adsorption device to the engine intake system.

The control system of an internal combustion engine according to claim 6 according to the present invention is the control system of an internal combustion engine according to claim 1 wherein when the opening degree of the exhaust control valve is the set opening degree or less to when it is made larger than the set opening degree, the intake control valve is fully closed when a delay time which is required for the exhaust gas to move from the exhaust control valve to the inlet of the bypass passage elapses or the intake control valve is made smaller in opening degree compared with when the opening degree of the exhaust control valve is the set opening degree or less.

The control system of an internal combustion engine according to claim 7 according to the present invention is the control system of an internal combustion engine according to claim 1 wherein when the opening degree of the exhaust control valve is larger than the set opening degree to when it is made the set opening degree or less, when a delay time which is required for the exhaust gas to move from the exhaust control valve to the inlet of the bypass passage elapses, the opening degree of the intake control valve is made the opening degree when the opening degree of the exhaust control valve is the set opening degree or less.

Advantageous Effects of Invention

According to the control system of an internal combustion engine according to claim 1 of the present invention, there is provided a control system of an internal combustion engine where an evaporated fuel adsorption device which adsorbs evaporated fuel in a fuel tank is provided, a bypass passage which bypasses a throttle valve of an engine intake system through the evaporated fuel adsorption device is provided at the evaporated fuel adsorption device as a fuel discharge path, and exhaust gas is made to recirculate through an exhaust gas recirculation passage which is connected to an upstream side from an inlet of the bypass passage of the engine intake system for exhaust gas recirculation, wherein an exhaust control valve is arranged at the exhaust gas recirculation passage, an intake control valve is arranged at the bypass passage, and when an opening degree of the exhaust control valve is larger than a set opening degree, the intake control valve is fully closed or the intake control valve is made smaller in opening degree compared with when the opening degree of the exhaust control valve is the set opening degree or less. Due to this, the phenomenon of the opening degree of the exhaust control valve being made larger than the set opening degree, a large amount of exhaust gas which is recirculated by exhaust gas recirculation passing through the bypass passage, and the large amount of $NO_x$ etc. in the exhaust gas being adsorbed at the evaporated fuel adsorption device can be suppressed and therefore a drop in evaporated fuel adsorption ability of the evaporated fuel adsorption device can be suppressed.

According to the control system of an internal combustion engine according to claim 2 of the present invention, there is provided a control system of an internal combustion engine according to claim 1 wherein the set opening degree is made the fully closed opening degree. Due to this, if the exhaust control valve is opened slightly and exhaust gas recirculation is performed, the intake control valve is fully closed or the intake control valve is made smaller in opening degree and the large amount of $NO_x$ etc. in the exhaust gas is kept from being adsorbed at the evaporated fuel adsorption device and therefore a drop in evaporated fuel adsorption ability of the evaporated fuel adsorption device can be suppressed.

Further, according to the control system of an internal combustion engine according to claim 3 of the present invention, there is provided a control system of an internal combustion engine according to claim 1 wherein a compressor is arranged at an upstream side from the inlet of the bypass passage of the engine intake system, a communicating passage which connects the atmosphere and the upstream side of the compressor of the engine intake system through the evaporated fuel adsorption device as another fuel discharge path is provided at the evaporated fuel adsorption device, the intake control valve is fully closed when the opening degree of the exhaust control valve is larger than the set opening degree, the exhaust gas is prevented from passing through the bypass passage, a drop in evaporated fuel adsorption ability of the evaporated fuel adsorption device can be suppressed. At this time, the fuel is discharged through the communicating passage from the evaporated fuel adsorption device to the engine intake system. Due to this, it is possible to make it harder for the amount of adsorbed fuel of the evaporated fuel adsorption device to reach the upper limit value.

Further, according to the control system of an internal combustion engine according to claim 4 of the present invention, there is provided a control system of an internal combustion engine according to claim 3 wherein a pump device which pumps air to the engine intake system side is provided at the communicating passage, and the fuel is discharged through the communicating passage from the evaporated fuel adsorption device to the engine intake system by air which is pumped by the pump device. Due to this, it is possible to reliably discharge fuel through the communicating passage from the evaporated fuel adsorption device to the engine intake system and possible to make it harder for the amount of adsorbed fuel of the evaporated fuel adsorption device to reach the upper limit value.

Further, according to the control system of an internal combustion engine according to claim 5 of the present invention, there is provided a control system of an internal combustion engine according to claim 4 wherein when the amount of adsorbed fuel of the evaporated fuel adsorption device is a set amount or more, fuel is discharged through the communicating passage from the evaporated fuel adsorption device to the engine intake system. Due to this, the pump device is prevented from being operated as much as possible.

Further, according to the control system of an internal combustion engine according to claim 6 of the present invention, there is provided a control system of an internal combustion engine according to claim 1 wherein when the opening degree of the exhaust control valve is the set opening degree or less to when it is made larger than the set opening degree, the intake control valve is fully closed when a delay time which is required for the exhaust gas to move from the exhaust control valve to the inlet of the bypass passage elapses or the intake control valve is made smaller in opening degree compared with when the opening degree of the exhaust control valve is the set opening degree or less. Due to this, during the delay time, the large amount of exhaust gas which is recirculated by exhaust gas recirculation does not pass through the bypass passage. Despite this, the intake control valve is prevented from being fully closed or the opening degree of the intake control valve from being made small and during the period of the delay time, fuel is discharged through the bypass passage from the evaporated fuel adsorption device to the engine intake system to thereby make it hard for the amount of adsorbed fuel of the evaporated fuel adsorption device to reach the upper limit value.

Further, according to the control system of an internal combustion engine according to claim 7 of the present invention, there is provided a control system of an internal combustion engine according to claim 1 wherein when the opening degree of the exhaust control valve is larger than the set opening degree to when it is made the set opening degree or less, when a delay time which is required for the exhaust gas to move from the exhaust control valve to the inlet of the bypass passage elapses, the opening degree of the intake control valve is made the opening degree when the opening degree of the exhaust control valve is the set opening degree or less. Due to this, during the period of this delay time, despite the fact that the large amount of exhaust gas which is recirculated by the exhaust gas recirculation ends up passing through the bypass passage, the intake control valve is prevented from being opened wide or the opening degree of the intake control valve from being made large and during the period of the delay time, the large amount of $NO_x$ etc. in the exhaust gas is kept from being adsorbed at the evaporated fuel adsorption device and the drop of the evaporated fuel adsorption ability is suppressed.

BRIEF DESCRIPTION OF DRAWINGS

FIG. 6 is a fifth flow chart which is followed according to the control system according to the present invention.

DESCRIPTION OF EMBODIMENTS

Figure 1:
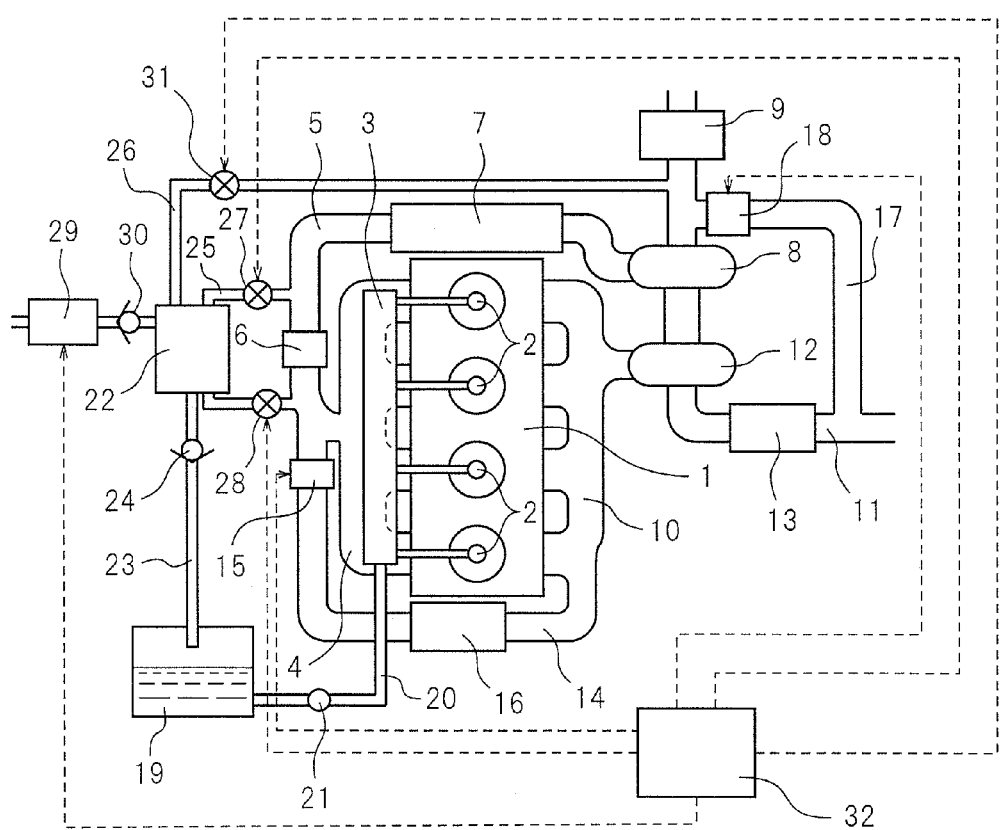
FIG. 1 is a schematic view which shows an internal combustion engine which is controlled by the control system according to the present invention.

FIG. 1 is a schematic view which shows an internal combustion engine which is controlled by a control system according to the present invention. Reference numeral 1 is an engine body. For example, it is a spark ignition type internal combustion engine which is fueled by gasoline or a diesel engine which is fueled by diesel fuel which contains alcohol. Reference numeral 2 is a fuel injector for injecting fuel to an individual cylinder of the engine body 1, while 3 is a common rail for feeding fuel to the fuel injectors. In the case of a spark ignition internal combustion engine, the fuel injectors are ones which inject fuel to intake ports of the cylinders.

Reference numeral 4 is an intake manifold which is connected to intake ports of the cylinders. At the upstream side of the intake manifold 4, an intake passage 5 is connected. At the intake passage 5, a throttle valve 6, an intercooler 7 for cooling the intake at the upstream side of the throttle valve 6, a compressor 8 of the turbocharger at the upstream side of the intercooler 7, an air cleaner 9 at the upstream side of a compressor 8, etc. are arranged. The intake manifold 4 and the intake passage 5 form an engine intake system.

On the other hand, 10 is an exhaust manifold which is connected to exhaust ports of the cylinders. At the downstream side of the exhaust manifold 10, an exhaust passage 11 is connected. At the exhaust passage 11, a turbine 12 of the turbocharger and an exhaust purification device 13 etc. such as a three-way catalyst device or $NO_x$ catalyst device is arranged. The exhaust manifold 10 and the exhaust passage 11 form an engine exhaust system.

To lower the combustion temperature and lower the amount of generation of $NO_x$, it is necessary to recirculate exhaust gas into the cylinders as an inert gas with a large heat capacity. For this reason, the exhaust manifold 10 and the intake passage 5 at the downstream side from the throttle valve 6 are connected by a high pressure exhaust gas recirculation passage 14. In the high pressure exhaust gas recirculation passage 14, a first exhaust control valve 15 which can close the high pressure exhaust gas recirculation passage 14 and controls the amount of recirculated exhaust gas and an EGR cooler 16 for cooling the recirculated exhaust gas (omitted when exhaust gas does not have to be cooled) are arranged.

The intake passage 5 at the downstream side of the throttle valve 6 becomes a high pressure due to supercharging by the compressor 8. Due to this, the high pressure exhaust gas recirculation passage 14 is connected to the exhaust manifold 10 which is filled with high pressure exhaust gas so as to make the exhaust gas recirculate to the intake passage 5 at the downstream side of the throttle valve 6.

However, if, like in the high pressure exhaust gas recirculation passage 14, making the exhaust gas recirculate from the upstream side from the turbine 12 of the turbocharger to the engine intake system, the amount of work of the turbine 12 ends up being reduced, so it is preferable to make the low pressure exhaust gas at the downstream side from the turbine 12 recirculate to the engine intake system.

Therefore, in the present embodiment, a low pressure exhaust gas recirculation passage 17 which connects the exhaust passage 11 at the downstream side from the turbine 12 (preferably downstream side of exhaust purification device 13) and the intake passage 5 at the upstream side of the compressor 8 is provided. The intake passage 5 at the upstream side of the compressor 8 becomes the atmospheric pressure or less, so exhaust gas of a pressure higher than the atmospheric pressure at the exhaust passage 11 at the downstream side from the turbine 12 can be made to recirculate through the low pressure exhaust gas recirculation passage 17. At the low pressure exhaust gas recirculation passage 17, a second exhaust control valve 18 is arranged for enabling the low pressure exhaust gas recirculation passage 17 to be closed and for controlling the amount of exhaust gas which is made to recirculate.

Reference numeral 19 is a fuel tank. The fuel tank 19 and common rail 3 are connected by a fuel pipe 20. At the fuel pipe 20, a fuel pump 21 is arranged for pumping fuel to the inside of the common rail 3. Further, the evaporated fuel which is generated inside the fuel tank 19 has to be prevented from being discharged to the atmosphere. For this reason, an evaporated fuel adsorption device 22 which adsorbs evaporated fuel is provided. At the evaporated fuel adsorption device 22, an introduction pipe 23 which introduces evaporated fuel inside the fuel tank 19 is connected. At the introduction pipe 23, a check valve 24 which allows only flow of evaporated fuel from the fuel tank 19 to the evaporated fuel adsorption device 22 is arranged. Backflow of evaporated fuel to the fuel tank 19 is prevented. The evaporated fuel adsorption device 22 is, for example, a general charcoal canister which is provided with activated charcoal which adsorbs evaporated fuel.

Such an evaporated fuel adsorption device 22 cannot unlimitedly adsorb evaporated fuel. To prevent the amount of adsorbed fuel from reaching the upper limit amount and making adsorption of evaporated fuel impossible, the fuel has to be discharged to the engine intake system.

The evaporated fuel adsorption device 22 generally utilizes the negative pressure which is generated at the intake passage 5 at the downstream side of the throttle valve 6 to cause discharge of fuel. However, when, as in the present embodiment, the compressor 8 of the turbocharger is provided in the engine intake system and supercharging is performed, almost no negative pressure is generated at the downstream side of the throttle valve 6. Therefore, at the evaporated fuel adsorption device 22, a bypass passage 25 which bypasses the throttle valve 6 through the inside of the evaporated fuel adsorption device 22 is provided as the fuel discharge path.

In this way, even with supercharging, the intake which passes through the bypass passage 25 enables fuel to be discharged from the evaporated fuel adsorption device 22 to the downstream side of the throttle valve 6.

Further, at the evaporated fuel adsorption device 22, as still another fuel discharge path, a communicating passage 26 is provided which communicates the air and the intake passage 5 at the upstream side of the compressor 8 through the inside of the evaporated fuel adsorption device 22. The communicating passage 26 is connected to the intake passage 5 at the downstream side of the air cleaner 9.

In the bypass passage 25 at the upstream side from the evaporated fuel adsorption device 22, a first intake control valve 27 is arranged. In the bypass passage 25 at the downstream side from the evaporated fuel adsorption device 22, a second intake control valve 28 is arranged. Further, in the communicating passage 26 at the upstream side from the evaporated fuel adsorption device 22, an air pump 29 which pumps air in the direction of the evaporated fuel adsorption device 22 and a check valve 30 which allows only the flow of air in the direction to the evaporated fuel adsorption device 22 are arranged. The check valve 30 is used to prevent the evaporated fuel from being discharged from the evaporated fuel adsorption device 22 to the atmosphere. At the upstream side of the air pump 29, a filter (not shown) is provided for removing foreign matter from the air which flows into the air pump 29. In the communicating passage 26 at the downstream side from the evaporated fuel adsorption device 22, a third intake control valve 31 is arranged.

Figure 2:
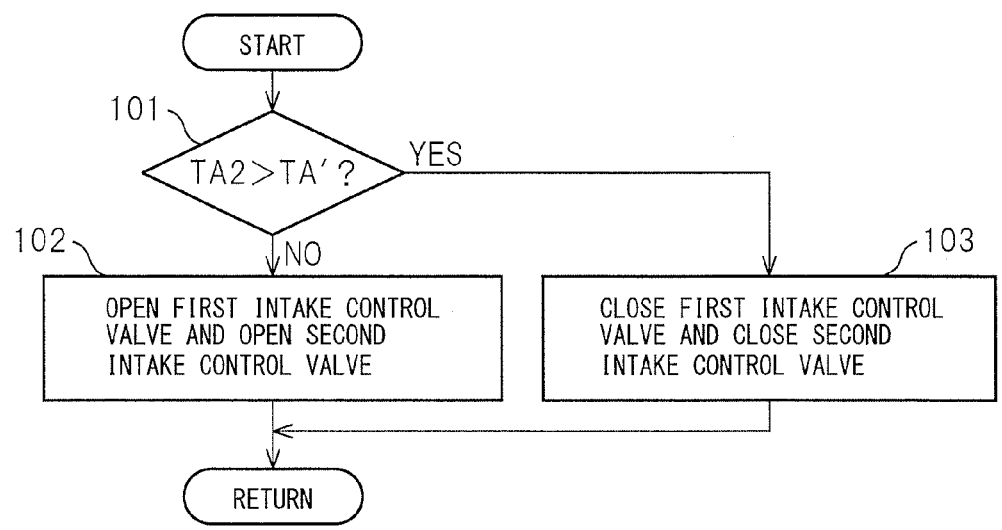
FIG. 2 is a first flow chart which is followed according to the control system according to the present invention.

Reference notation 32 is an electronic control device. This controls the ignition timing of the spark plugs, the fuel injection amount of the fuel injectors 2, and, when the throttle valve 6 is an electronically controlled type, the amount of intake through the throttle valve 6 and follows the first flow chart which is shown in FIG. 2 to control components such as the second exhaust control valve 18 of the low pressure exhaust gas recirculation passage 17 and the first intake control valve 27 and the second intake control valve 28 of the bypass passage 25.

The present flow chart is repeatedly followed every set time. The opening degree of the second exhaust control valve 18 is controlled so as to make the desired amount of exhaust gas corresponding to the engine operating state recirculate through the low pressure exhaust gas recirculation passage 17. At step 101, it is judged if the opening degree of the second exhaust control valve 18 is larger than the set opening degree TA'. When the judgment of step 101 is negative, at step 102, the first intake control valve 27 is opened wide and the second intake control valve 28 is opened wide. When the judgment of step 101 is negative, exhaust gas is not being recirculated through the low pressure exhaust gas recirculation passage 17 or only a slight amount of exhaust gas is recirculated through the low pressure exhaust gas recirculation passage 17.

Due to this, the intake which passes through the bypass passage 25 does not contain a large amount of exhaust gas and the large amount of $NO_x$ etc. in the exhaust gas is not adsorbed at the evaporated fuel adsorption device 22 and does not lower the evaporated fuel adsorption ability, so the first intake control valve 27 is opened wide and the second intake control valve 28 is opened wide and the intake which passes through the bypass passage 25 is used to discharge the adsorbed fuel of the evaporated fuel adsorption device 22 into the intake passage 5.

On the other hand, when the judgment of step 101 is affirmative, at step 103, the first intake control valve 27 is fully closed and the second intake control valve 28 is fully closed. When the judgment of step 101 is affirmative, a large amount of exhaust gas is recirculated through the low pressure exhaust gas recirculation passage 17. If opening wide the first intake control valve 27 and the second intake control valve 28 at this time, intake which includes a large amount of exhaust gas would pass through the bypass passage 25, the large amount of $NO_x$ etc. in the exhaust gas would be adsorbed at the evaporated fuel adsorption device 22, and the evaporated fuel adsorption ability of the evaporated fuel adsorption device 22 would end up being greatly reduced.

Due to this, the first intake control valve 27 and the second intake control valve 28 are fully closed to prevent the intake which includes a large amount of exhaust gas from flowing through the bypass passage 25 into the evaporated fuel adsorption device 22 and to suppress a drop in the evaporated fuel adsorption ability of the evaporated fuel adsorption device 22.

In the judgment of step 101, the set opening degree TA' can be made about ⅓ of the wide open opening degree (for example, 60° when the wide open opening degree is 180°). Due to this, when the opening degree TA2 of the second exhaust control valve 18 is the set opening degree TA' or less, only a small amount of exhaust gas is recirculated through the low pressure exhaust gas recirculation passage 17. Even if intake which contains exhaust gas passes through the bypass passage 25, the large amount of $NO_x$ etc. in the exhaust gas will not be adsorbed at the evaporated fuel adsorption device 22.

In this way, when the opening degree TA2 of the second exhaust control valve 18 is the set opening degree TA' or less, the first intake control valve 27 and the second intake control valve 28 are opened wide and fuel is made to be discharged from the evaporated fuel adsorption device 22 so as to be able to make it hard for the amount of adsorbed fuel of the evaporated fuel adsorption device 22 to reach the upper limit value.

Further, the set opening degree TA' at the judgment of step 101 may be made the fully closed opening degree (for example, 0°). Due to this, when the opening degree TA2 of the second exhaust control valve 18 is larger than the set opening degree TA', that is, when the second exhaust control valve 18 is slightly opened, the first intake control valve 27 and the second intake control valve 28 are fully closed. Even if the intake contains a small amount of exhaust gas, this is prevented from passing through the bypass passage 25 so almost no $NO_x$ etc. is adsorbed at the evaporated fuel adsorption device 22 and a drop in the evaporated fuel adsorption ability of the evaporated fuel adsorption device 22 is suppressed.

Further, when the opening degree TA2 of the second exhaust control valve 18 is larger than the set opening degree TA', at step 103, the first intake control valve 27 and the second intake control valve 28 are fully closed, but it is also possible to make the opening degree of the first intake control valve 27 and the second intake control valve 28 smaller compared with when the opening degree TA2 of the second exhaust control valve 18 is the set opening degree TA' or less. Due to this, when the opening degree TA2 of the second exhaust control valve 18 becomes larger than the set opening degree TA' and a large amount of exhaust gas is recirculated through the low pressure exhaust gas recirculation passage 17, it is possible to reduce the amount of exhaust gas which passes through the bypass passage 25 compared with when the opening degrees of the first intake control valve 27 and the second intake control valve 28 are maintained as they are and a drop in the evaporated fuel adsorption ability of the evaporated fuel adsorption device 22 can be suppressed.

Figure 3:
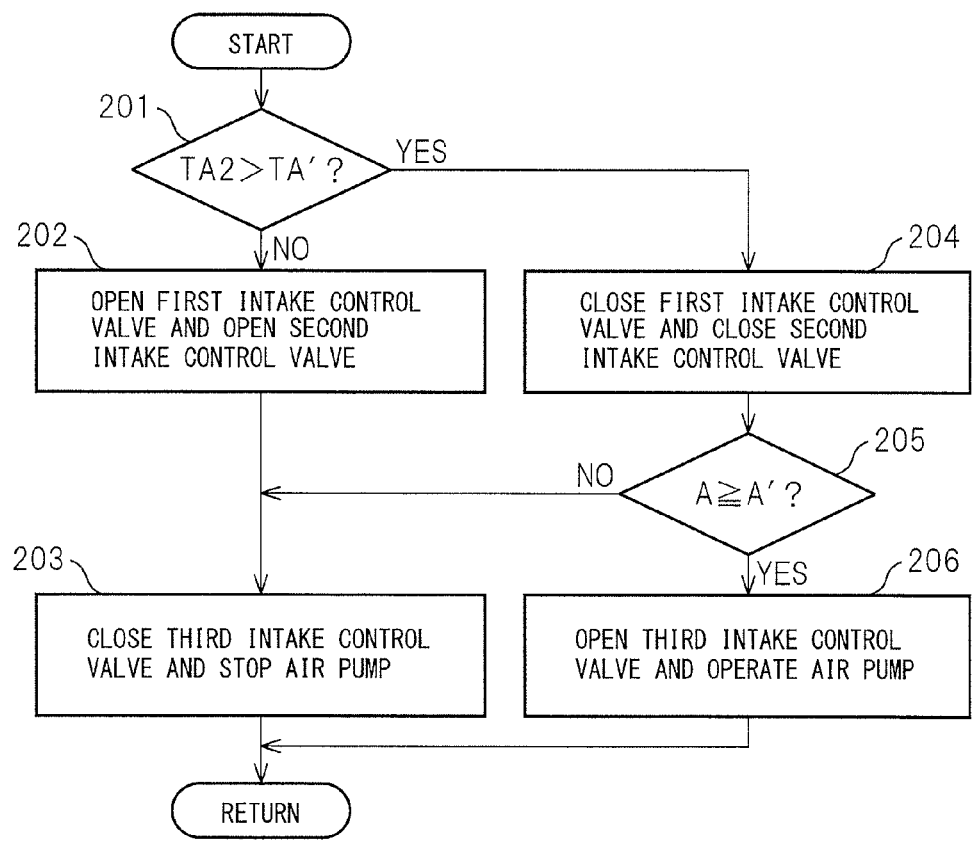
FIG. 3 is a second flow chart which is followed according to the control system according to the present invention.

Further, the electronic control device 32 is used to control components in accordance with the second flow chart which is shown in FIG. 3 such as the second exhaust control valve 18 of the low pressure exhaust gas recirculation passage 17, the first intake control valve 27 and the second intake control valve 28 of the bypass passage 25, and the air pump 29 and the third intake control valve 31 of the communicating passage 26.

The present flow chart is repeatedly followed every set time. The opening degree of the second exhaust control valve 18 is controlled so as to make the desired amount of exhaust gas corresponding to the engine operating state recirculate through the low pressure exhaust gas recirculation passage 17. At step 201, it is judged if the opening degree of the second exhaust control valve 18 is larger than the set opening degree TA'. When the judgment of step 201 is negative, at step 202, the first intake control valve 27 is opened wide and the second intake control valve 28 is opened wide. When the judgment of step 201 is negative, exhaust gas is not being recirculated through the low pressure exhaust gas recirculation passage 17 or only a slight amount of exhaust gas is recirculated through the low pressure exhaust gas recirculation passage 17.

Due to this, the intake which passes through the bypass passage 25 does not contain a large amount of exhaust gas. The large amount of $NO_x$ etc. in the exhaust gas is not adsorbed at the evaporated fuel adsorption device 22 and does not lower the evaporated fuel adsorption ability, so the first intake control valve 27 is opened wide and the second intake control valve 28 is opened wide and the intake which passes through the bypass passage 25 is used to discharge the adsorbed fuel of the evaporated fuel adsorption device 22 to the intake passage 5. Next, at step 203, the third intake control valve 31 is fully closed and the air pump 29 is stopped.

On the other hand, when the judgment of step 201 is affirmative, at step 204, the first intake control valve 27 is fully closed and the second intake control valve 28 is fully closed. When the judgment of step 201 is affirmative, a large amount of exhaust gas is recirculated through the low pressure exhaust gas recirculation passage 17. If opening wide the first intake control valve 27 and the second intake control valve 28 at this time, intake which includes a large amount of exhaust gas would pass through the bypass passage 25, the large amount of $NO_x$ etc. in the exhaust gas would be adsorbed at the evaporated fuel adsorption device 22, and the evaporated fuel adsorption ability of the evaporated fuel adsorption device 22 would end up being greatly lowered.

Due to this, by fully closing the first intake control valve 27 and the second intake control valve 28, intake which includes a large amount of exhaust gas is prevented from flowing through the bypass passage 25 to the evaporated fuel adsorption device 22 and the evaporated fuel adsorption ability of the evaporated fuel adsorption device 22 is kept from falling.

Next, at step 205, it is judged if the current amount of adsorbed fuel A of the evaporated fuel adsorption device 22 is the set amount A' or more. The amount of adsorbed fuel A of the evaporated fuel adsorption device 22 is, for example, calculated in the period from when fuel is first fed to the fuel tank 19 to the present by adding a predetermined amount of adsorption per unit time every unit time when fuel is not made to be discharged through the bypass passage 25 and the communicating passage 26, by subtracting a predetermined amount of adsorption per unit time every unit time when fuel is made to be discharged through the communicating passage 26, and by subtracting a predetermined amount of adsorption per unit time every unit time when fuel is made to be discharged through the bypass passage 25. In calculation of such an amount of adsorbed fuel A, the amount of adsorbed fuel A is guarded from becoming a minus value.

When the judgment of step 205 is negative, there is leeway until the amount of adsorbed fuel A reaches the upper limit value, so at step 203, the third intake control valve 31 is fully closed and the air pump 29 is made to stop. By operating the air pump 29 the minimum necessary amount in this way, deterioration of the fuel economy is suppressed. Due to this, the bypass passage 25 and the communicating passage 26 are closed and fuel is not discharged from the evaporated fuel adsorption device 22, so the amount of adsorbed fuel A gradually increases.

Here, at step 204, when fully closing the first intake control valve 27 and the second intake control valve 28, even if the air pump 29 is stopped, if the third intake control valve 31 is opened wide, the upstream side of the compressor 8 of the intake passage 5 sometimes becomes a negative pressure due to operation of the compressor 8. The amount of discharge per unit time is small, but it is possible to discharge fuel through the communicating passage 26 from the evaporated fuel adsorption device 22 to the intake passage 5.

On the other hand, when the judgment of step 205 is affirmative, there is not that much leeway until the amount of adsorbed fuel A reaches the upper limit value and the evaporated fuel adsorption device 22 can no longer be adsorbed at the evaporated fuel. At step 206, the third intake control valve 31 is opened wide and the air pump 29 is made to operate and the air which passes through the communicating passage 26 is used to make the fuel be discharged from the evaporated fuel adsorption device 22 to the intake passage 5.

Of course, it is also possible to not perform the judgment of step 205. When closing the bypass passage 25 at step 204, at step 206, it is also possible to open wide the third intake control valve 31 and operate the air pump 29 so as to use the air which passes through the communicating passage 26 to discharge fuel from the evaporated fuel adsorption device 22 to the intake passage 5.

In the same way as the first flow chart, at the judgment of step 201, the set opening degree TA' can be made about ⅓ of the wide open opening degree (60° when, for example, the wide open opening degree is 180°). Further, in the same way as the first flow chart, the set opening degree TA' at the judgment of step 201 may be made the fully closed opening degree (for example, 0°).

Further, in the same way as the first flow chart, when the opening degree TA2 of the second exhaust control valve 18 is larger than the set opening degree TA', at step 204, the opening degrees of the first intake control valve 27 and the second intake control valve 28 may be made smaller compared with when the opening degree TA2 of the second exhaust control valve 18 is the set opening degree TA' or less.

Figure 4:
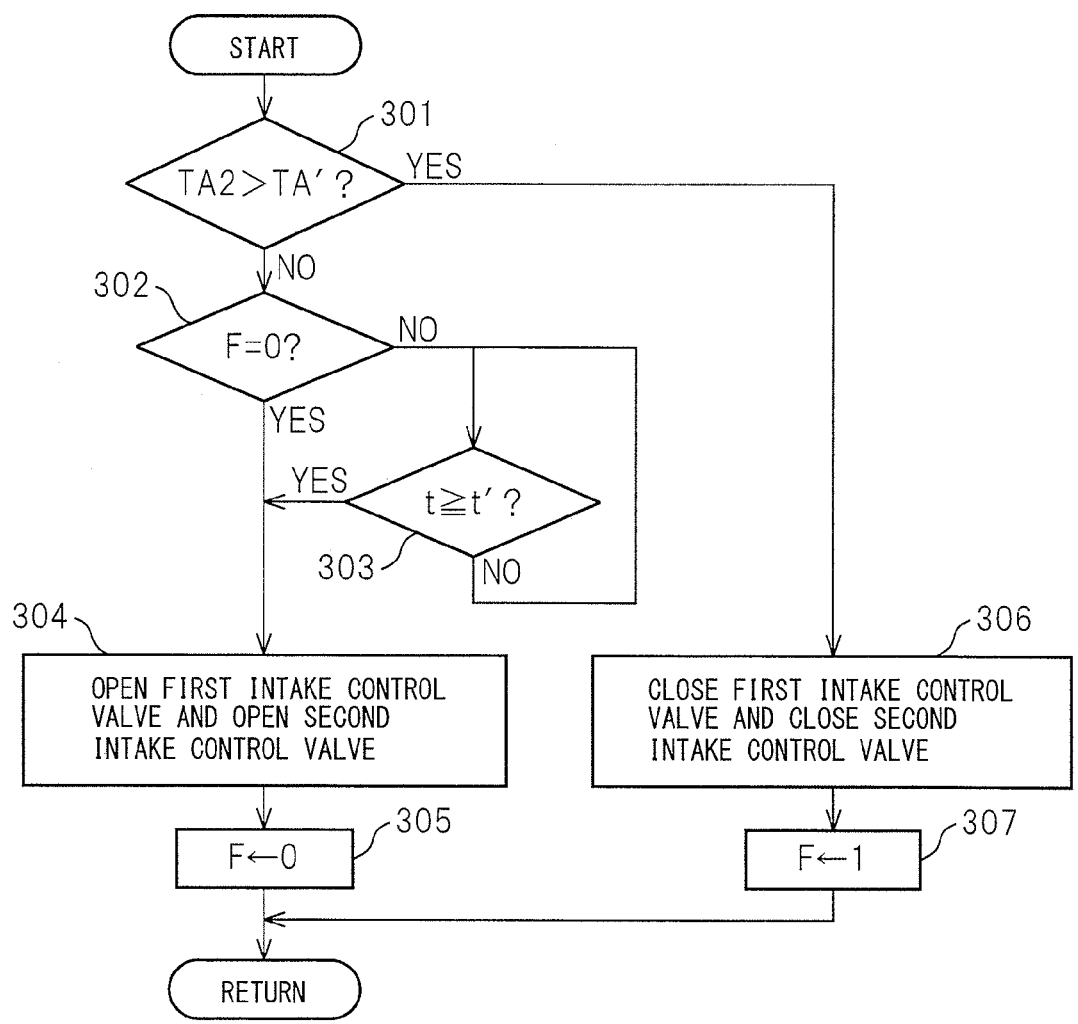
FIG. 4 is a third flow chart which is followed according to the control system according to the present invention.

Further, the electronic control device 32 is used to control components in accordance with the third flow chart which is shown in FIG. 4 such as the second exhaust control valve 18 of the low pressure exhaust gas recirculation passage 17 and the first intake control valve 27 and the second intake control valve 28 of the bypass passage 25.

The present flow chart is repeatedly followed every set time. The opening degree of the second exhaust control valve 18 is controlled so as to make the desired amount of exhaust gas corresponding to the engine operating state recirculate through the low pressure exhaust gas recirculation passage 17. At step 301, it is judged if the opening degree of the second exhaust control valve 18 is larger than the set opening degree TA'. When the judgment of step 301 is negative, at step 302, it is judged if the flag F is 0. The flag F will be explained later.

When the judgment of step 302 is affirmative, at step 304, the first intake control valve 27 is opened wide and the second intake control valve 28 is opened wide. When the judgment of step 301 is negative, exhaust gas is not being recirculated through the low pressure exhaust gas recirculation passage 17 or only a slight amount of exhaust gas is recirculated through the low pressure exhaust gas recirculation passage 17.

Due to this, the intake which passes through the bypass passage 25 does not contain a large amount of exhaust gas. The large amount of $NO_x$ etc. in the exhaust gas is not adsorbed at the evaporated fuel adsorption device 22 and does not lower the evaporated fuel adsorption ability, so the first intake control valve 27 is opened wide and the second intake control valve 28 is opened wide and the intake which passes through the bypass passage 25 is used to discharge the adsorbed fuel of the evaporated fuel adsorption device 22 to the intake passage 5. Next, at step 305, the flag F is made 0.

On the other hand, when the judgment of step 301 is affirmative, at step 306, the first intake control valve 27 is fully closed and the second intake control valve 28 is fully closed. When the judgment of step 301 is affirmative, a large amount of exhaust gas is recirculated through the low pressure exhaust gas recirculation passage 17. If opening wide the first intake control valve 27 and the second intake control valve 28 at this time, the intake which includes a large amount of exhaust gas would pass through the bypass passage 25, the large amount of $NO_x$ etc. in the exhaust gas would be adsorbed at the evaporated fuel adsorption device 22, and the evaporated fuel adsorption ability of the evaporated fuel adsorption device 22 would end up being greatly lowered.

Due to this, the first intake control valve 27 and the second intake control valve 28 are fully closed to thereby prevent the intake which includes a large amount of exhaust gas from flowing through the bypass passage 25 to the evaporated fuel adsorption device 22 and suppressing a drop in the evaporated fuel adsorption ability of the evaporated fuel adsorption device 22. Next, at step 307, the flag F is made 1.

In the same way as the first flow chart, at the judgment of step 301, the set opening degree TA' can be made about ⅓ of the wide open opening degree (for example, 60° when the wide open opening degree is 180°). Further, in the same way as the first flow chart, the set opening degree TA' at the judgment of step 301 may be made the fully closed opening degree (for example, 0°).

Further, in the same way as the first flow chart, when the opening degree TA2 of the second exhaust control valve 18 is larger than the set opening degree TA', at step 306, the opening degrees of the first intake control valve 27 and the second intake control valve 28 may be made smaller compared to when the opening degree TA2 of the second exhaust control valve 18 is the set opening degree TA' or less.

The flag F is made 0 at step 305, that is, is made 0 when the first intake control valve 27 and the second intake control valve 28 are opened wide. On the other hand, the flag F is made 1 at step 307, that is, is made 1 when the first intake control valve 27 and the second intake control valve 28 are fully closed.

In this way, when it is judged at step 302 if the flag F is 0 and this judgment is negative, the first intake control valve 27 and the second intake control valve 28 were fully closed the previous time. If, at step 304, immediately opening wide the first intake control valve 27 and the second intake control valve 28, the intake which includes a comparatively large amount of exhaust gas in the intake passage 5 would end up flowing into the evaporated fuel adsorption device 22.

Due to this, when the judgment of step 302 is negative, at step 303, it is judged if the elapsed time t from when the judgment of step 302 is negative has reached the set time t'. This is repeated until the judgment of step 303 is affirmative. If the elapsed time t reaches the set time t', the judgment of step 303 is affirmative and, at step 304, the first intake control valve 27 and the second intake control valve 28 are opened wide.

The set time t' is the time which is required for the exhaust gas in the low pressure exhaust gas recirculation passage 17 to move from the second exhaust control valve 18 to the inlet (upstream side opening) of the bypass passage 25. If the judgment of step 303 is affirmative, the intake which includes a comparatively large amount of exhaust gas in the intake passage 5 moves from the inlet of the bypass passage 25 to the downstream side. Even if opening wide the first intake control valve 27 and the second intake control valve 28, the intake which includes a comparatively large amount of exhaust gas in the intake passage 5 never flows to the evaporated fuel adsorption device 22. In this way, when the opening degree TA2 of the second exhaust control valve 18 is made larger than the set opening degree TA' to when it is made the set opening degree TA' or less, when the delay time (set time t') elapses, at step 304, the first intake control valve 27 and the second intake control valve 28 are opened wide. During this delay time, the large amount of $NO_x$ etc. in the exhaust gas is prevented from being adsorbed at the evaporated fuel adsorption device 22 and a drop in the evaporated fuel adsorption ability is suppressed.

Figure 5:
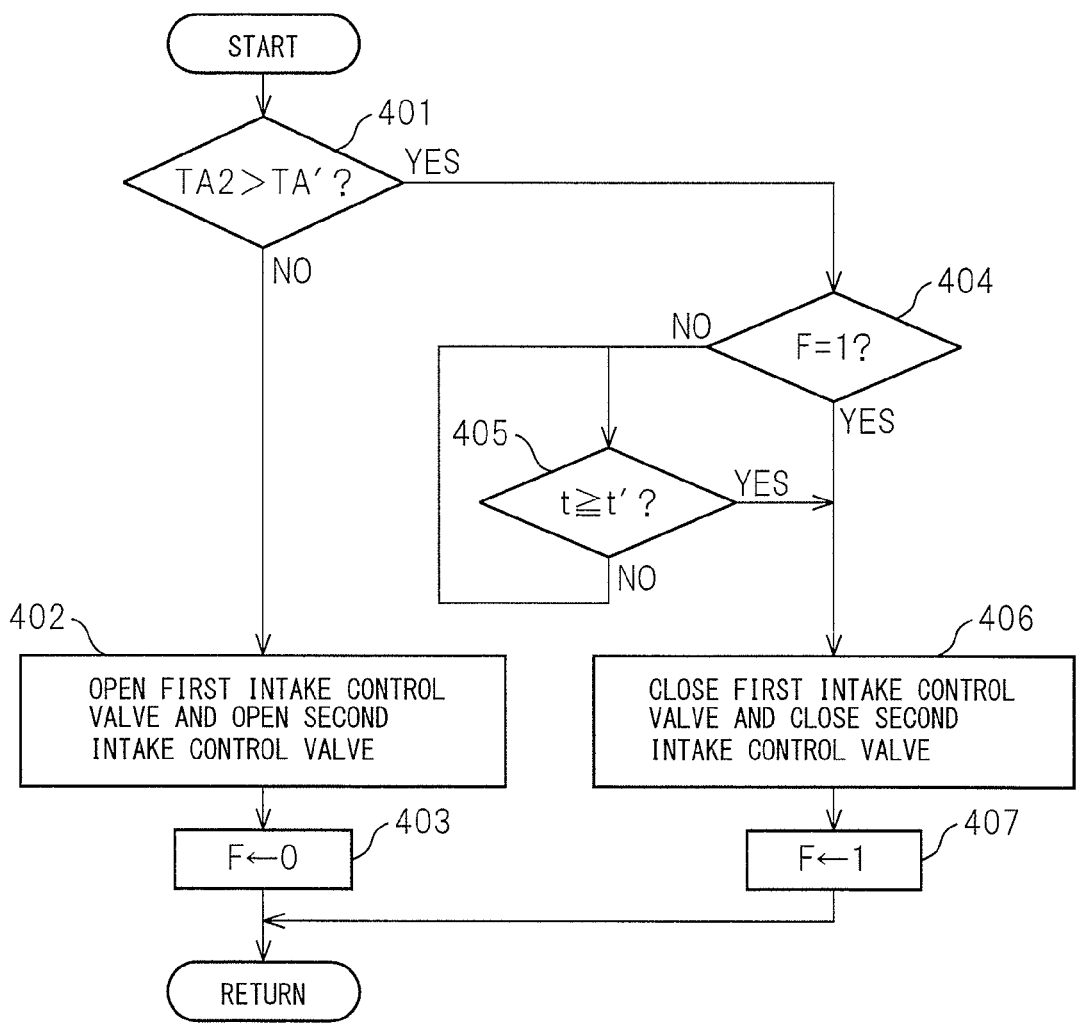
FIG. 5 is a fourth flow chart which is followed according to the control system according to the present invention.

Further, the electronic control device 32 may be used to control components in accordance with the fourth flow chart which is shown in FIG. 5 such as the second exhaust control valve 18 of the low pressure exhaust gas recirculation passage 17 and the first intake control valve 27 and the second intake control valve 28 of the bypass passage 25.

The present flow chart is repeatedly followed every set time. The opening degree of the second exhaust control valve 18 is controlled so that the desired amount of exhaust gas corresponding to the engine operating state is made to recirculate through the low pressure exhaust gas recirculation passage 17. At step 401, it is judged if the opening degree of the second exhaust control valve 18 is larger than the set opening degree TA'. When the judgment of step 401 is negative, at step 402, the first intake control valve 27 is opened wide and the second intake control valve 28 is opened wide. When the judgment of step 401 is negative, the exhaust gas is not recirculated through the low pressure exhaust gas recirculation passage 17 or only a slight amount of exhaust gas is recirculated through the low pressure exhaust gas recirculation passage 17.

Due to this, the intake which passes through the bypass passage 25 does not contain a large amount of exhaust gas and the large amount of $NO_x$ etc. in the exhaust gas is not adsorbed at the evaporated fuel adsorption device 22 and does not lower the evaporated fuel adsorption ability, so the first intake control valve 27 is opened wide and second intake control valve 28 is opened wide and the intake which passes through the bypass passage 25 is used to make the adsorbed fuel of the evaporated fuel adsorption device 22 be discharged into the intake passage 5. Next, at step 403, the flag F is made 0.

On the other hand, when the judgment of step 401 is affirmative, at step 404, it is judged if the flag F is 1. When the judgment of step 404 is affirmative, at step 406, the first intake control valve 27 is fully closed and the second intake control valve 28 is fully closed. When the judgment of step 401 is affirmative, a large amount of exhaust gas is recirculated through the low pressure exhaust gas recirculation passage 17. If opening wide the first intake control valve 27 and the second intake control valve 28 at this time, the intake which includes a large amount of exhaust gas would pass through the bypass passage 25, the large amount of $NO_x$ etc. in the exhaust gas would be adsorbed at the evaporated fuel adsorption device 22, and the evaporated fuel adsorption ability of the evaporated fuel adsorption device 22 would end up being greatly reduced.

Due to this, the first intake control valve 27 and the second intake control valve 28 are fully closed to prevent the intake which includes a large amount of exhaust gas from flowing through the bypass passage 25 to the evaporated fuel adsorption device 22 and to suppress a drop in the evaporated fuel adsorption ability of the evaporated fuel adsorption device 22. Next, at step 407, the flag F is made 1.

In the same way as the first flow chart, at the judgment of step 401, the set opening degree TA' can be made about ⅓ of the wide open opening degree (for example, 60° when the wide open opening degree is 180°). Further, in the same way as the first flow chart, the set opening degree TA' at the judgment of step 401 may be made the fully closed opening degree (for example, 0°).

Further, in the same way as the first flow chart, when the opening degree TA2 of the second exhaust control valve 18 is larger than the set opening degree TA', at step 406, the opening degrees of the first intake control valve 27 and the second intake control valve 28 may be made smaller compared with when the opening degree TA2 of the second exhaust control valve 18 is the set opening degree TA' or less.

The flag F is made 0 at step 403, that is, is made 0 when the first intake control valve 27 and the second intake control valve 28 are opened wide. On the other hand, the flag F is made 1 at step 407, that is, is made 1 when the first intake control valve 27 and the second intake control valve 28 are fully closed.

In this way, when it is judged at step 404 if the flag F is 1 and this judgment is negative, the first intake control valve 27 and the second intake control valve 28 were opened wide the previous time. If, at step 406, immediately closing the first intake control valve 27 and the second intake control valve 28, despite the intake which includes a relatively large amount of exhaust gas not reaching the bypass passage 25 in the intake passage 5, the bypass passage 25 is closed and fuel is prevented from being discharged from the evaporated fuel adsorption device 22.

Due to this, when the judgment of step 404 is negative, at step 405, it is judged if the elapsed time t from when the judgment of step 404 becomes negative has reached the set time t'. This is repeated until the judgment of step 405 is affirmative. If the elapsed time t reaches the set time t', the judgment of step 405 is affirmative, while at step 406, the first intake control valve 27 and the second intake control valve 28 are fully closed.

The set time t' is the time which is required for the exhaust gas inside the low pressure exhaust gas recirculation passage 17 to move from the second exhaust control valve 18 to the inlet (upstream side opening) of the bypass passage 25. If the judgment of step 405 is affirmative, the intake which includes a comparatively large amount of exhaust gas in the intake passage 5 reaches the inlet of the bypass passage 25. If not making the first intake control valve 27 and the second intake control valve 28 fully closed, the intake which includes a comparatively large amount of exhaust gas in the intake passage 5 ends up flowing into the evaporated fuel adsorption device 22. In this way, when the opening degree TA2 of the second exhaust control valve 18 is made the set opening degree TA' or less to when it is made larger than the set opening degree TA', when the delay time (set time t') elapses, at step 406, the first intake control valve 27 and the second intake control valve 28 are made to fully close. During this delay time, fuel is made to be discharged through the bypass passage 25 from the evaporated fuel adsorption device 22 to the intake passage 5 and it becomes hard for the amount of adsorbed fuel of the evaporated fuel adsorption device 22 to reach the upper limit value.

Further, the electronic control device 32 may be used to control components in accordance with the fifth flow chart which is shown in FIG. 6 such as the first exhaust control valve 15 of the high pressure exhaust gas recirculation passage 14, the second exhaust control valve 18 of the low pressure exhaust gas recirculation passage 17, the first intake control valve 27 and the second intake control valve 28 of the bypass passage 25, and the air pump 29 and third intake control valve 31 of the communicating passage 26.

This flow chart is repeatedly followed every set time. The opening degree of the first exhaust control valve 15 is controlled so as to make the desired amount of exhaust gas corresponding to the engine operating state recirculate through the high pressure exhaust gas recirculation passage 14. Further, the opening degree of the second exhaust control valve 18 is controlled so as to make the desired amount of exhaust gas corresponding to the engine operating state recirculate through the low pressure exhaust gas recirculation passage 17. At step 601, it is judged if the opening degree TA1 of the first exhaust control valve 15 is larger than 0° (fully closed opening degree), that is, if the first exhaust control valve 15 is opened. For example, at the time of engine low load (the engine load is less than the set load), it is preferable to raise the temperature in the cylinder and promote vaporization of the fuel. For this, even if lowering the amount of work of the turbine 12 for causing recirculation of the high temperature exhaust gas, exhaust gas recirculation is sometimes performed through the high pressure exhaust gas recirculation passage 14. At this time, the judgment of step 601 is affirmative. At step 602, it is judged if the flag F is 0.

When the judgment of step 602 is affirmative, at step 604, the first intake control valve 27 is opened wide and the second intake control valve 28 is opened wide. When the judgment of step 601 is affirmative, exhaust gas is recirculated through the high pressure exhaust gas recirculation passage 14. Exhaust gas is not recirculated through the low pressure exhaust gas recirculation passage 17, so the intake which passes through the bypass passage 25 does not contain exhaust gas, the evaporated fuel adsorption ability of the evaporated fuel adsorption device 22 is not lowered, and the intake which passes through the bypass passage 25 can be used to discharge the fuel to the intake passage 5.

Next, at step 605, the flag F is made 0, while at step 606, the third intake control valve 31 is fully closed and the air pump 29 is stopped.

On the other hand, when the judgment of step 601 is negative, that is, when the first exhaust control valve 15 is fully closed and exhaust gas is not being recirculated through the high pressure exhaust gas recirculation passage 14, at step 607, it is judged if the opening degree TA2 of the second exhaust control valve 18 is larger than the set opening degree TA'. When this judgment is affirmative, at step 608, it is judged if the flag F is 1.

When the judgment of step 608 is affirmative, at step 610, the first intake control valve 27 is fully closed and the second intake control valve 28 is fully closed. When the judgment of step 607 is affirmative, a large amount of exhaust gas is recirculated through the low pressure exhaust gas recirculation passage 17. If opening wide the first intake control valve 27 and the second intake control valve 28 at this time, the intake which includes a large amount of exhaust gas would pass through the bypass passage 25, the large amount of $NO_x$ etc. in the exhaust gas would be adsorbed at the evaporated fuel adsorption device 22, and the evaporated fuel adsorption ability of the evaporated fuel adsorption device 22 would end up being greatly lowered.

Due to this, at this time, the first intake control valve 27 and the second intake control valve 28 are fully closed to prevent intake which includes a large amount of exhaust gas from flowing through the bypass passage 25 to the evaporated fuel adsorption device 22 and to keep the evaporated fuel adsorption ability of the evaporated fuel adsorption device 22 from falling.

Next, at step 611, the flag F is made 1, while at step 612, it is judged if the current amount of adsorbed fuel A of the evaporated fuel adsorption device 22 is the set amount A' or more. The amount of adsorbed fuel A of the evaporated fuel adsorption device 22 is, for example, calculated from when fuel is first fed to the fuel tank 19 to the present by adding a predetermined amount of adsorption per unit time every unit time when fuel is not made to be discharged through the bypass passage 25 and the communicating passage 26, by subtracting a predetermined amount of adsorption per unit time every unit time when fuel is made to be discharged through the communicating passage 26, and by subtracting a predetermined amount of adsorption per unit time every unit time when fuel is made to be discharged through the bypass passage 25. In calculation of such an amount of adsorbed fuel A, the amount of adsorbed fuel A is guarded from becoming a minus value.

When the judgment of step 612 is negative, since there is leeway until the amount of adsorbed fuel A reaches the upper limit value, at step 606, the third intake control valve 31 is fully closed and the air pump 29 is made to stop. By operating the air pump 29 the minimum necessary amount, the fuel economy is kept from deteriorating. Due to this, the bypass passage 25 and the communicating passage 26 are closed and fuel is prevented from being discharged from the evaporated fuel adsorption device 22, so the amount of adsorbed fuel A gradually increases.

Here, when fully closing the first intake control valve 27 and the second intake control valve 28 at step 610, even if stopping the air pump 29, if opening wide the third intake control valve 31, the upstream side of the compressor 8 of the intake passage 5 sometimes becomes a negative pressure due to operation of the compressor 8. The amount of discharge per unit time is small, but it is possible to make fuel be discharged through the communicating passage 26 from the evaporated fuel adsorption device 22 to the intake passage 5.

On the other hand, when the judgment of step 612 is affirmative, there is not that much leeway until the amount of adsorbed fuel A reaches the upper limit value and the evaporated fuel adsorption device 22 can no longer adsorb evaporated fuel. At step 613, the third intake control valve 31 is opened wide and the air pump 29 is operated to discharge fuel from the evaporated fuel adsorption device 22 to the intake passage 5 due to the air which passes through the communicating passage 26.

Of course, it is also possible to not perform the judgment of step 612. When closing the bypass passage 25 at step 610, at step 613, it is also possible to open wide the third intake control valve 31 and operate the air pump 29 so as to use the air which passes through the communicating passage 26 to discharge fuel from the evaporated fuel adsorption device 22 to the intake passage 5.

At the judgment of step 607, the set opening degree TA' can be made about ⅓ of the wide open opening degree (for example, 60° when the wide open opening degree is 180°). Due to this, when the opening degree TA2 of the second exhaust control valve 18 is the set opening degree TA' or less, only a small amount of exhaust gas is recirculated through the low pressure exhaust gas recirculation passage 17. Even if the intake air which contains exhaust gas is made to pass through the bypass passage 25, the evaporated fuel adsorption device 22 will never adsorb the large amount of $NO_x$ etc. in the exhaust gas.

In this way, when the opening degree TA2 of the second exhaust control valve 18 is the set opening degree TA' or less, the first intake control valve 27 and the second intake control valve 28 can be opened wide and fuel can be made to be discharged from the evaporated fuel adsorption device 22 to thereby make it hard for the amount of adsorbed fuel of the evaporated fuel adsorption device 22 to reach the upper limit value.

Further, the set opening degree TA' at the judgment of step 607 may also be made the fully closed opening degree (for example, 0°). Due to this, when the opening degree TA2 of the second exhaust control valve 18 is larger than the set opening degree TA', that is, if the second exhaust control valve 18 is opened slightly, the first intake control valve 27 and the second intake control valve 28 are fully closed. If the intake contains even a small amount of exhaust gas, this is prevented from passing through the bypass passage 25, the evaporated fuel adsorption device 22 is prevented from absorbing almost any $NO_x$ etc., and the drop in the evaporated fuel adsorption ability of the evaporated fuel adsorption device 22 is thereby suppressed.

Further, when the opening degree TA2 of the second exhaust control valve 18 is larger than the set opening degree TA', at step 610, the first intake control valve 27 and the second intake control valve 28 are made to fully close, but the opening degrees of the first intake control valve 27 and the second intake control valve 28 may also be made smaller compared to when the opening degree TA2 of the second exhaust control valve 18 is the set opening degree TA' or less. Due to this, when the opening degree TA2 of the second exhaust control valve 18 becomes larger than the set opening degree TA' and a large amount of exhaust gas is recirculated through the low pressure exhaust gas recirculation passage 17, compared to when the opening degrees of the first intake control valve 27 and the second intake control valve 28 are maintained, the amount of exhaust gas which passes through the bypass passage 25 can be reduced and the drop in the evaporated fuel adsorption ability of the evaporated fuel adsorption device 22 can be suppressed.

The flag F is made 0 at step 605, that is, is made 0 when opening wide the first intake control valve 27 and the second intake control valve 28. On the other hand, the flag F is made 1 at step 611, that is, is made 1 when the first intake control valve 27 and the second intake control valve 28 are fully closed.

In this way, when it is judged at step 602 if the flag F is 0 and this judgment is negative, the first intake control valve 27 and the second intake control valve 28 were fully closed the previous time. At step 604, if the first intake control valve 27 and the second intake control valve 28 end up being immediately opened wide, the intake which includes a comparatively large amount of exhaust gas in the intake passage 5 ends up flowing into the evaporated fuel adsorption device 22.

Due to this, when the judgment of step 602 is negative, at step 603, it is judged if the elapsed time t from when the judgment of step 202 is negative has reached a set time t'. This is repeated until the judgment of step 603 is affirmative. If the elapsed time t reaches the set time t', the judgment of step 603 is affirmative, and, at step 604 the first intake control valve 27 and the second intake control valve 28 are opened wide.

The set time t' is the time which is required for the exhaust gas in the low pressure exhaust gas recirculation passage 17 to move from the second exhaust control valve 18 to the inlet (upstream side opening) of the bypass passage 25. If the judgment of step 603 is affirmative, the intake which includes a comparatively large amount of exhaust gas in the intake passage 5 moves from the inlet of the bypass passage 25 to the downstream side. Even if making the first intake control valve 27 and the second intake control valve 28 open wide, the intake which includes a comparatively large amount of exhaust gas in the intake passage 5 will not flow into the evaporated fuel adsorption device 22. In this way, when the opening degree TA2 of the second exhaust control valve 18 is made larger than the set opening degree TA' to when it is made the set opening degree TA' or less, when the delay time (set time t') passes, at step 604, the first intake control valve 27 and the second intake control valve 28 are made to open wide. During this delay time, the large amount of NO$_x$ etc. in the exhaust gas is prevented from being adsorbed at the evaporated fuel adsorption device 22 and the drop in the evaporated fuel adsorption ability is suppressed.

Further, when it is judged at step 608 if the flag F is 1 and this judgment is negative, the first intake control valve 27 and the second intake control valve 28 were opened wide the previous time. At step 610, if the first intake control valve 27 and the second intake control valve 28 are immediately fully closed, the intake which includes a relatively large amount of exhaust gas inside the intake passage 5 will not reach the bypass passage 25, but the bypass passage 25 will be shut to prevent fuel from being discharged from the evaporated fuel adsorption device 22.

Due to this, when the judgment of step 608 is negative, at step 609, it is judged if the elapsed time t from when the judgment of step 608 is negative has reached the set time t'. This is repeated until the judgment of step 609 is affirmative. If the elapsed time t reaches the set time t', the judgment of step 609 is affirmative and, at step 610, the first intake control valve 27 and the second intake control valve 28 are fully closed.

The set time t' is the time required for the exhaust gas in the low pressure exhaust gas recirculation passage 17 to move from the second exhaust control valve 18 to the inlet (upstream side opening) of the bypass passage 25. If the judgment of step 609 is affirmative, the intake which includes a comparatively large amount of exhaust gas in the intake passage 5 is reaching the bypass passage 25. If not causing the first intake control valve 27 and the second intake control valve 28 to fully close, the intake which includes a comparatively large amount of exhaust gas in the intake passage 5 ends up flowing into the evaporated fuel adsorption device 22. In this way, when the opening degree TA2 of the second exhaust control valve 18 is the set opening degree TA' or less to when it is made larger than the set opening degree TA', when the delay time (set time t') elapses, at step 610, the first intake control valve 27 and the second intake control valve 28 are made to fully close. During this delay time, fuel is made to be discharged through the bypass passage 25 from the evaporated fuel adsorption device 22 to the intake passage 5 and it is made hard for the amount of adsorbed fuel of the evaporated fuel adsorption device 22 to reach the upper limit value.

In the present flow chart, the judgment of step 601 may be omitted and the judgment of step 607 may be first performed. In the present embodiment, at the bypass passage 25, the first intake control valve 27 is arranged at the upstream side of the evaporated fuel adsorption device 22 and the second intake control valve 28 is arranged at the downstream side of the evaporated fuel adsorption device 22. For example, in the fifth flow chart, at step 610, the first intake control valve 27 and the second intake control valve 28 are simultaneously fully closed. Due to this, it is possible to reliably prevent intake which includes a large amount of exhaust gas from flowing through the bypass passage 25 to the evaporated fuel adsorption device 22 from both the upstream side and downstream side of the throttle valve 6.

Further, as in the present embodiment, when the evaporated fuel adsorption device 22 is provided with another fuel discharge path constituted by the communicating passage 26, when opening wide the third intake control valve 31 of the communicating passage 26 to make fuel be discharged through the communicating passage 26, to prevent intake which includes a large amount of exhaust gas from flowing through the bypass passage 25 to the evaporated fuel adsorption device 22 from both the upstream side and downstream side of the throttle valve 6, it is necessary to fully close both of the first intake control valve 27 and the second intake control valve 28. However, if such another fuel discharge system path is provided, even if one of the first intake control valve 27 and the second intake control valve 28 is omitted, the bypass passage 25 can be shut.

In the present embodiment, at the intake passage 5, a compressor 8 of a turbocharger is arranged, but when exhaust gas is recirculated to the upstream side from the inlet of the bypass passage 25 of the intake passage 5, the present invention can be applied even if the compressor 5 is a compressor of a supercharger.

REFERENCE SIGNS LIST

1 engine body
14 high pressure exhaust gas recirculation passage
15 first exhaust control valve
17 low pressure exhaust gas recirculation passage
18 second exhaust control valve
19 fuel tank
22 evaporated fuel adsorption device
25 bypass passage
26 communicating passage
27 first intake control valve
28 second intake control valve
29 air pump 29
31 third intake control valve

The invention claimed is:

1. A control system of an internal combustion engine that includes an evaporated fuel adsorption device which adsorbs evaporated fuel in a fuel tank, a bypass passage which bypasses a throttle valve of an engine intake system through said evaporated fuel adsorption device that is provided at said evaporated fuel adsorption device as a fuel discharge path, and wherein an exhaust gas is made to recirculate through an exhaust gas recirculation passage which is connected to an upstream side from an inlet of said bypass passage of said engine intake system for exhaust gas recirculation, comprising:
   an exhaust control valve arranged at said exhaust gas recirculation passage;
   an intake control valve arranged at said bypass passage; and
   an electronic control unit configured to:
      determine whether an opening degree of said exhaust control valve is larger than a set opening degree,
      based upon the opening degree of said exhaust control valve being larger than the set opening degree, fully close said intake control valve or control an opening degree of said intake control valve to be made smaller as compared with when said opening degree of said exhaust control valve is equal to or less than said set opening degree.

2. The control system of an internal combustion engine according to claim 1, wherein said set opening degree is a fully closed opening degree of 0°.

3. The control system of an internal combustion engine according to claim 1, wherein a compressor is arranged at an upstream side from said inlet of said bypass passage of said engine intake system, a communicating passage which connects atmosphere and an upstream side of said compressor of said engine intake system through said evaporated fuel adsorption device as another fuel discharge path is provided at said evaporated fuel adsorption device, said electronic control unit is configured to fully close said intake control valve when said opening degree of said exhaust control valve is larger than said set opening degree, and thereby fuel is discharged through said communicating passage from said evaporated fuel adsorption device to said engine intake system.

4. The control system of an internal combustion engine according to claim 3, wherein a pump device which pumps air to said engine intake system side is provided at said communicating passage, and said fuel is discharged through said communicating passage from said evaporated fuel adsorption device to said engine intake system by air which is pumped by said pump device.

5. The control system of an internal combustion engine according to claim 4, wherein when an amount of adsorbed fuel of said evaporated fuel adsorption device is a set amount or more, said fuel is discharged through said communicating passage from said evaporated fuel adsorption device to said engine intake system.

6. The control system of an internal combustion engine according to claim 1, wherein when said opening degree of said exhaust control valve is equal to less than said set opening degree to when said opening degree of said exhaust control valve is made larger than said set opening degree, the electronic control unit is further configured to fully close said intake control valve when a delay time which is required for said exhaust gas to move from said exhaust control valve to said inlet of said bypass passage elapses or to make an opening degree of said intake control valve smaller as compared with when said opening degree of said exhaust control valve is equal to or less than said set opening degree.

7. The control system of an internal combustion engine according to claim 1, wherein when said opening degree of said exhaust control valve is larger than said set opening degree to when said opening degree of said exhaust control valve is made equal to or less than said set opening degree, when a delay time which is required for said exhaust gas to move from said exhaust control valve to said inlet of said bypass passage elapses, the electronic control unit is further configured to make an opening degree of said intake control valve an opening degree when said opening degree of said exhaust control valve is equal to or less than said set opening degree.

* * * * *